United States Patent
Hughes

(10) Patent No.: US 10,223,040 B2
(45) Date of Patent: Mar. 5, 2019

(54) GENERATING CONNECTION SCOPED TEMPORARY COLOR DEVICES

(75) Inventor: Richard Hughes, London (GB)

(73) Assignee: Red Hat, Inc., Raleigh, NC (US)

( * ) Notice: Subject to any disclaimer, the term of this patent is extended or adjusted under 35 U.S.C. 154(b) by 1571 days.

(21) Appl. No.: 13/307,378

(22) Filed: Nov. 30, 2011

(65) Prior Publication Data
US 2013/0139177 A1    May 30, 2013

(51) Int. Cl.
H04N 1/46    (2006.01)
G06F 3/12    (2006.01)
H04N 1/60    (2006.01)

(52) U.S. Cl.
CPC .......... *G06F 3/1204* (2013.01); *G06F 3/1225* (2013.01); *G06F 3/1285* (2013.01); *H04N 1/603* (2013.01)

(58) Field of Classification Search
None
See application file for complete search history.

(56) References Cited

U.S. PATENT DOCUMENTS

| | | | |
|---|---|---|---|
| 6,789,111 B1 * | 9/2004 | Brockway ............. | G06F 9/4411 709/203 |
| 7,020,881 B2 * | 3/2006 | Takahashi et al. ........... | 719/322 |
| 7,650,399 B2 * | 1/2010 | Fukasawa et al. ............ | 709/223 |
| 2004/0267881 A1 * | 12/2004 | Yao ....................... | G06F 9/4411 709/203 |
| 2009/0327474 A1 * | 12/2009 | Ida ................................ | 709/223 |
| 2012/0265865 A1 * | 10/2012 | Tanaka et al. ................ | 709/223 |

OTHER PUBLICATIONS

Winson Lan et al. "Next Generation Color Management Process Modeling for Digital Printing" (Year: 2006).*
Kim Jin-Seo et al "Development of Color Management System Prototype" (Year: 1998).*

* cited by examiner

*Primary Examiner* — Brian W Wathen
*Assistant Examiner* — Abdou K Seye
(74) *Attorney, Agent, or Firm* — Lowenstein Sandler LLP

(57) ABSTRACT

A method and system for creating temporary color devices in a color management module. The color management module is configured to identify the registration of a color device by a management subsystem via a message communication system connection, wherein the registration comprises color device information. The color management module monitors the connection to identify a termination event associated with the subsystem, and removes the color device information automatically in response to the identification of the termination event.

24 Claims, 4 Drawing Sheets

FIGURE 3

| Color Device Registration Table ||||||
| Color Device Information | Subsystem Name | Connection used for Registration | Service Name | Address (e.g., a D-Bus connection address) |
|---|---|---|---|---|
| Printer XYZ | CUPS | Connection A | PrinterXYZ.SessionUserID.ProfileID | :3104 |
| Scanner 49SL | SANE | Connection B | Scanner49SL.SessionUserID.ProfileID | :1034 |
| Camera MX3L | UDEV | Connection C | CameraMX3L.SessionUserID.ProfileID | :7391 |
| Display P7Y | X Display Manager | Connection N | DisplayP7Y.SessionUserID.ProfileID | :5912 |

GENERATING CONNECTION SCOPED TEMPORARY COLOR DEVICES

TECHNICAL FIELD

Embodiments of the present invention relate to computing systems, and more specifically, to managing color devices associated with a computing system.

BACKGROUND

Computing systems typically have numerous color devices (i.e., devices that display or produce color) such as, for example, printers, scanners, cameras, and displays. In order to manage the color rendering of the color devices, computing systems often implement subsystems or daemons to control one or more associated color devices. Examples of such subsystems include the Scanner Access Now Easy (SANE) subsystem which provides standardized access to any raster image scanner hardware (e.g., flatbed scanner, hand-held scanner), the X Window System subsystem which provides management of displays and monitors, and the UDev subsystem which provides management of devices such as web cameras and still cameras.

Another exemplary subsystem is CUPS (formerly an acronym for Common Unix Printing System) which provides print management functionality. CUPS performs various management tasks associated with color printers, such as converting information produced by an application into a format that a printer can understand and sending the information to the printer for printing. For example, with respect to color printers, CUPS is typically responsible for determining which color characterization profile is associated with a specific type of printer, with a specific paper type.

In operation, the CUPS subsystem may register a color printer with a color management module (e.g., a subsystem or daemon configured to manage, install, and generate color profiles to accurately color manage input and output devices) of the computing system in order to have the appropriate color characterization profile associated with the color printer. The registration for printers is done at the system level, wherein a color device is associated with a particular user during a particular session.

In current computing systems, the registration of the color device by subsystem is typically "permanent" in that the device remains registered until it is manually removed. This can result in the duplication of devices if the subsystem that registered the device is later reloaded. Moreover, the permanently registered devices should be explicitly cleared when the registering subsystem is started, otherwise all previously registered devices, including session devices, may remain registered. This can create a significant problem in computing environments wherein a user having associated color device characterization profiles is given a "seat" enabling the user to participate in a particular session. In such cases, the devices associated with those seats that are registered during a session may remain registered even after the seat has been removed.

An additional problem exists with respect to permanent color devices when the subsystem controlling the color device experiences a termination event such as for example, a forced quit, crash, unexpected exit, or a reload. In such cases, the previously registered color devices remain registered following the aforementioned termination events. This leads to duplicate device registrations when the color device management subsystem is restarted or reloaded.

BRIEF DESCRIPTION OF THE DRAWINGS

FIG. 3 is an exemplary color device registration table, according to an embodiment of the present invention.

DETAILED DESCRIPTION

Figure 1:
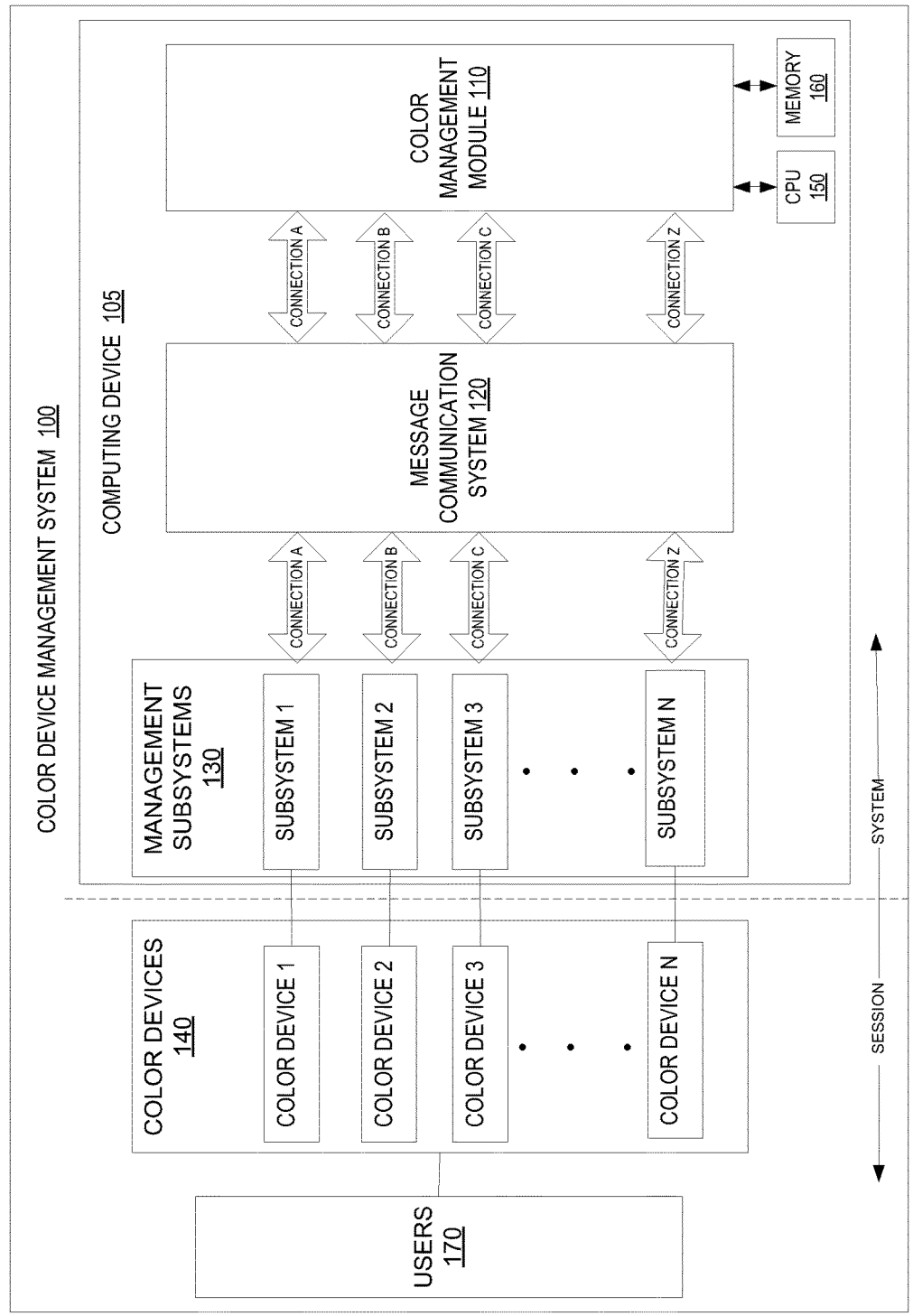
FIG. 1 is a block diagram of an exemplary computing system according to embodiments of the invention.

Methods and systems for managing registration and the removal of registered color devices upon the occurrence of a termination event associated with the associated management subsystem. One or more color devices are registered with a color management module by an associated management subsystem. The management subsystem may be any software program or daemon configured to manage one or more associated color devices, such as, for example, a printer management subsystem, a display management subsystem, a scanner management subsystem, or a camera management subsystem. Exemplary management subsystems include, but are not limited to, the CUPS printer management subsystem, the SANE scanner management subsystem, the X Window System display management subsystem, and the UDev device management subsystem. A color device may be any device capable of rendering, displaying, producing, receiving, and/or transmitting color, such as, for example, a printer, a scanner, a display/monitor, and a camera.

The color device management system may include a color management module configured to register color devices. The color devices may be registered with the color management module by an associated management subsystem via a message communication system connection. The message communication system may be any suitable inter-process call (IPC) system or an inter-process communication bus such as D-bus. In one embodiment, the color management module monitors the connection used to register the color device to identify the occurrence of a termination event associated with the management subsystem. A termination event may be any event which results in the closing of the management subsystem including, but not limited to, a forced quit, frozen or non-responsive state, a crash, an unexpected exit, or a reload.

In response to the identification of the subsystem termination event, the color management module can remove the color devices registered by the management system. The removal of the color device may include garbage collecting all information associated with the registered color device, thereby removing the registration of the color device from a database stored in a memory in response to the termination event. In this regard, the color devices are registered as "temporary" devices, since the color devices are temporarily scoped or linked to the connection used to register the color device. Moreover, the color devices are temporary in that the registration of the color devices is automatically invalidated and removed from the database upon the occurrence of the termination event. The occurrence of the termination event may be determined by the color management module by monitoring the message communication system connection used to register the color device.

In an embodiment, the management subsystem utilizes a connection of the message communication system to send a request to the color management module to register a color device. When the management subsystem is terminated, the management subsystem will drop off of the message communication system. The color management module may monitor the message communication system connection and associated request and automatically, in response to the management subsystem falling off of the message communication system, clean up or remove any registration in the database that was created or associated with that management subsystem. For example, the device registration may be stored in a hash table which maps the color device to an identifier of the connection used to register the device. In response to the termination event, the association between the color device and the connection identifier is removed from the hash table, which cause the color device to be finalized and removed from the color management module.

Advantageously, removing previous color device registrations prevents a subsequent user and session from being blocked when attempting to have that user's color characterization profile associated with the same color device.

In one embodiment, the message communication system alerts the color management module that a management subsystem (i.e., a process) has terminated and that the associated connection has also been terminated.

In an embodiment, a color device to be registered may be detected by the management subsystem and then actively registered with the color management system in a database stored in a memory. In this embodiment, the management subsystem provides the color management module with suitable information regarding the color device to enable the color management module to determine an appropriate color profile, register the device, and store the device registration in the database. In another embodiment, the color management module may detect the color device by probing for device classes that do not have a native management subsystem (e.g., scanners, digital cameras), obtaining information about the color device (e.g., serial number, model, description), and mapping or associating the color device with a color profile.

In an embodiment, the color management module is configured to assign one or more color characterization profiles with a registered color device in accordance with mapping conditions, policies, profiles and rules maintained in an associated memory.

In an embodiment, a color device may be registered for a particular session and a particular user. In such instances, the color device may be assigned a color characterization profile that is specific to that session and/or the user. The color management module may determine a session identifier (ID) and/or a user ID in order to assign the appropriate color characterization profile to the registered color device.

For example, a first user (User 1) may engage in a session and have the color device (Printer XYZ) that he or she is using registered with an association to his or her color characterization profile (Profile U1). Upon the occurrence of a termination event, the color management module removes the registration of Printer XYZ and the associated assignment of Profile U1 to that printer from the database. Advantageously, when a second user (User 2) subsequently initiates a session wherein he or she is using Printer XYZ, the color management module can properly assign User 2's color characterization profile (Profile U2) to that color device. By removing the prior registration information, subsequent registrations can be made, with different profiles, without being blocked by an artifact or previous registration that should no longer be applied.

In an embodiment, a color device registered by management subsystem is removed by the color management module using a garbage collecting technique. For example, when a management subsystem connects to the color management module, a name (i.e., a bus name) is registered which gives the management subsystem a unique "name" on the message communication system (e.g., the D-bus). The color management module may recognize when the name associated with the management subsystem disappears from the message communication system. When a management subsystem disconnects from the message communication system, the color management module looks up the bus name in an associated database and, if the bus name matches a listing in the database, the color management module garbage collects or removes the one or more color devices and associated profiles that this bus name registered. In an embodiment, the color management module monitors the connection used to register the color device and begins the removal process when a service name and/or address associated with the management subsystem is removed from the message communication system.

Accordingly, an efficient mechanism is provided that creates "temporary" color devices that are scoped or associated with the connection of a message communication system (e.g., D-bus) used to register the color device, such that the color device registration is removed from the database or cleaned up automatically in response to the detection of a termination event of the associated management subsystem (e.g., CUPS, SANE, UDev, X Window System). Advantageously, once the requesting or calling process (i.e., the management subsystem) quits, the corresponding message communication system connection is closed and any associated color devices are removed. This action frees up the previously registered color devices for later use by other users in subsequent sessions, without a conflict with prior registrations of the devices.

FIG. 1 is a block diagram of exemplary color device management system 100 according to embodiments of the invention. The color device management system 100 includes a computing device 105 (e.g., a computer or server) executing a color management module 110 configured to manage multiple color devices 140.

As shown in FIG. 1, the color management module 110 is communicatively connected to multiple management subsystems 130 (e.g., Subsystem 1, Subsystem 2, Subsystem 3, . . . Subsystem N) via a message communication system 120 and its multiple connections (e.g., Connection A, Connection B, Connection C, . . . Connection Z). The message communication system 120 provides for inter-process or inter-application communications, such as communications between the management subsystems 130 and the color management module 110 relating to the registration of a color device 140 by a corresponding management subsystem 130. In an exemplary embodiment, the message communication system 120 may include a D-bus.

One having ordinary skill in the art will appreciate that the associations between the connections and the subsystems shown in FIG. 1 are presently merely for illustration purposes, and that the connections are not necessarily dedicated to particular management subsystems 130.

The management subsystems 130 may be any software program or daemon executable by the computing device 105 to manage one or more associated color devices 140, such as, for example, a printer management subsystem, a display management subsystem, a scanner management subsystem, and a camera management subsystem. One having ordinary skill in the art will appreciate that the computing device 105 may be comprised of multiple computing devices communicatively connected and configured to execute and manage the modules and devices shown in FIG. 1.

As shown in FIG. 1, the color device management system 100 is architecturally arranged to include a system level and a session level. In an embodiment, by splitting the color device management system 100 into two levels (i.e., system and session), the management subsystems 130 and the color management module 110 may be privileged, while the color devices 140 are unprivileged, thereby maximizing the security of the color device management system 100 in view of the often untrusted nature of the code of the color devices 140. Furthermore, the two level architecture permits the addition of per-session resources to the color management module 110 which are not available in the system context, such as, for example, color displays. In addition, the two level architecture enables multi-user support without relying on each user session to gracefully establish (i.e., set up) and close (i.e., tear down) resources (i.e., the color devices) in the event of a user change, which is particularly useful in computing environments having fast user switching.

Users 170 may utilize the color devices 140 to perform any number of suitable tasks (e.g., printing, scanning, image capturing, displaying). The color devices 140 are managed by a corresponding management subsystem 130. For example, a user may wish to utilize a printer (Color Device 1) during a particular session. The printer (Color Device 1) may be managed by a corresponding management subsystem (Subsystem 1), such as CUPS.

One having ordinary skill in the art will appreciate that the users 170 may utilize any type of computing device such as, for example, a desktop computer, a portable digital assistant, a mobile phone, a laptop computer, a portable media player, a tablet computer, a netbook, a notebook, or a personal computer.

In an embodiment, the color management module 110 is coupled to a central processing unit (CPU) 150 and memory 160 of the computing device 105. The memory 160 may be configured to store the color device database including the color device registration information (e.g., the table shown in FIG. 3) and color characterization profiles. In an embodiment, the color management module 110 is configured to communicate with one or more management subsystems 130 to register one or more color devices 140, and remove the temporarily registered color devices 140 from the database upon the detection of a termination event relating to the management subsystem 130.

Figure 2:
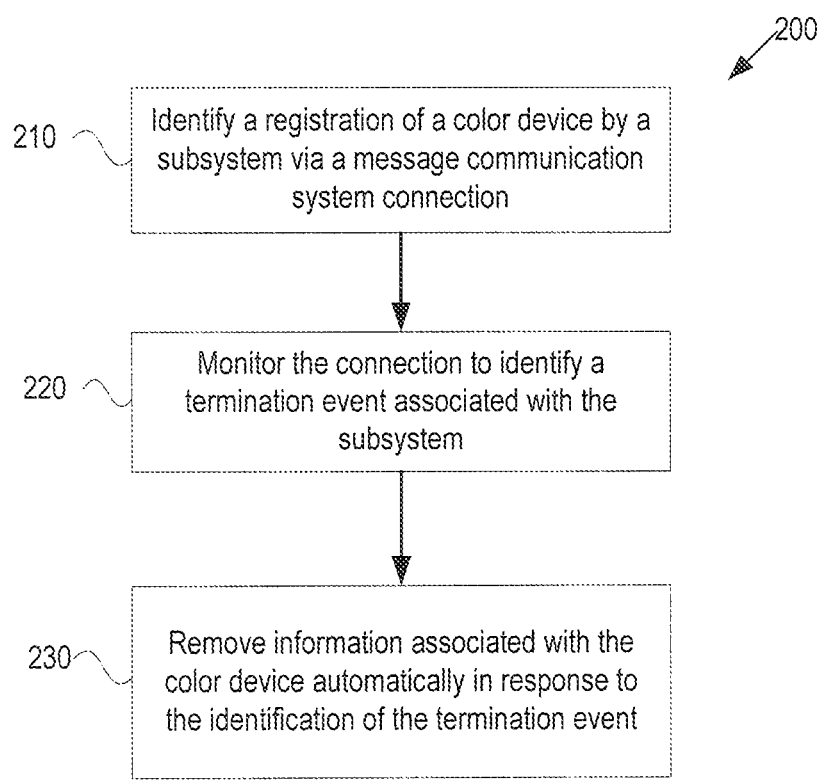
FIG. 2 is a flow diagram of one embodiment of a method for managing color devices, according to an embodiment of the present invention.

FIG. 2 is a flow diagram of one embodiment of a method 200 for cleaning or removing a registration of a color device from a database upon the occurrence of a termination event associated with a management subsystem managing the color device. The method is performed by processing logic that may comprise hardware (circuitry, dedicated logic, etc.), software (such as is run on a general purpose computer system or a dedicated machine), or a combination of both. In one embodiment, the method is performed by a component of a computing device (e.g., the color management module 110 of the computing device 105 of FIG. 1).

Referring to FIG. 2, method 200 begins with the color management module 110 identifying a registration of a color device by a management subsystem, in block 210. In block 210, the color management module 110 identifies the connection of the message communication system (e.g., message communication system 120 of FIG. 1) that was used by the management subsystem 130 to register the color device 140. In an embodiment, the connection used by the management subsystem 130 is identified by listening to the D-bus for a request or call from the management subsystem 130 relating to the registration of the color device 140, according to known D-bus messaging protocols. In an embodiment, the color management module 110 recognizes the registration of a color device and makes a record of the registration in a database in any suitable format, such as, for example, in the exemplary color device registration table 300 shown in FIG. 3.

In an embodiment, the color device to be registered may be detected by the management subsystem and then actively registered with the color management system using a message communication system connection.

In an embodiment, the color management module detects and registers the color device. In this embodiment, the management subsystem detects when the registered color device closes or otherwise goes away. For example, when a color display is removed, the management subsystem is notified and removes the color display from the color management module.

As shown in FIG. 3, the color management module 110 may collect information relating to the registration, including, but not limited to, a color device name or identifier (e.g., serial number, model name/number), a management subsystem name or identifier, a registration connection name or identifier, a service name associated with the management subsystem, and/or an address associated with the management subsystem pertaining to a specific color device 140. In an embodiment, the color device registration table 300 may be maintained in a database stored in a memory accessible by the color management module, such as, for example memory 160 shown in FIG. 1. One having ordinary skill in the art will appreciate that the color management module 110 may track and record color device registrations in any suitable format (e.g., tabular form) and may include in the registration record any suitable information to identify the registration.

With reference to FIG. 2, the color management module 110 monitors the connection used to register the color device to identify a termination event associated with the management subsystem, in block 220. In an embodiment, the color management module 110 monitors or listens to the message communication system connection used to register the color device and identifies the occurrence of the termination event (e.g., the management subsystem crashes, exits, reloads) when a service name and/or address associated with the management subsystem is removed from the message communication system. The service name and/or address associated with the management subsystem may be removed from (or falls off of) the message communication system 120 (e.g., the D-bus) upon the occurrence of the termination event. In an embodiment, the color management module 110 detects when the service name and/or address falls off the message communication system 120 (i.e., detection of the termination event) since the message communication system 120 no longer communicates requests on behalf of the management subsystem 130.

In block 230, in response to the identification of the termination event, the color management module 110 removes information associated with the registered color device (i.e., the color device registration information). In an embodiment, the removal of the registered color device includes automatically garbage collecting the devices when the management subsystem 130 that created the color device registration terminates. Accordingly, the color device is considered to be a "temporary" device scoped to the message communication system connection since the color device is removed from the database if the calling process (i.e., the management subsystem) terminates based on a monitoring of the registration connection. Advantageously, according to the method 200, duplicate color devices are not registered by the color device management system 100 if the associated management subsystem 130 is reloaded.

A further advantage is realized by the method 200 in that registered color devices do not need to be explicitly cleared when a management subsystem is started, since the temporarily registered color devices are removed or cleared upon detection of the termination event. This is particularly advantageous in computing environments wherein different sessions may register a single color device to multiple users 170 having different color characterization profiles.

Figure 4:
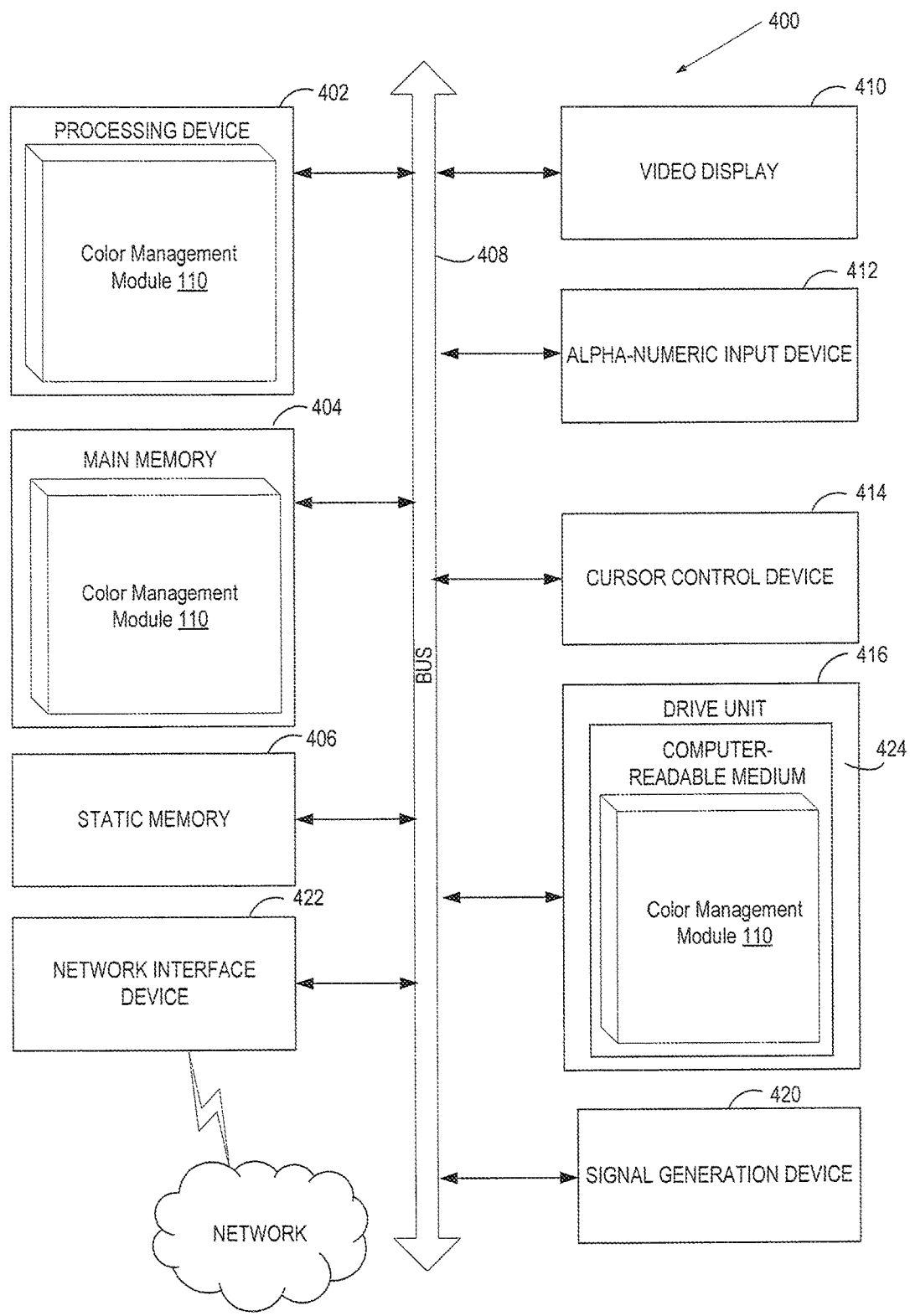
FIG. 4 illustrates an exemplary color device management system.

FIG. 4 illustrates an exemplary color device management system 400 in the form of a computer system within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary color device management system 400 includes a processing device (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The color management module 110 and computing device 105 in FIG. 1 may comprise processing device 402 configured to perform the operations and steps discussed herein.

The color device management system 400 may further include a network interface device 422. The color device management system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

A drive unit 416 may include a computer-readable medium 424 on which is stored one or more sets of instructions (e.g., instructions of color management module 110) embodying any one or more of the methodologies or functions described herein. The instructions of the color management module 110 may also reside, completely or at least partially, within the main memory 404 and/or within the processing device 402 during execution thereof by the color device management system 400, the main memory 404 and the processing device 402 also constituting computer-readable media. The instructions of the color management module 110 may further be transmitted or received over a network via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "monitoring", "removing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    identifying, by a processing device of a computer system, a registration of a color device by a management subsystem via a connection with a message communication system, wherein the registration comprises color device information;
    in response to the registration, storing, by the processing device, the color device information of the registration in a database;
    identifying a color profile associated with a session;
    assigning the color profile to the color device;
    executing the color device in accordance with the color profile;
    monitoring, by the processing device, the connection used to register the color device to detect a removal from the message communication system of at least one of a service name or address associated with the management subsystem in view of a termination event associated with the management subsystem; and
    removing, by the processing device, the color device information from the database in response to the termination event.

2. The method of claim 1, wherein the message communication system comprises an inter-process communication bus.

3. The method of claim 1, wherein the monitoring comprises querying the connection to identify the termination event.

4. The method of claim 1, wherein the monitoring comprises listening to the connection used to register the color device to determine if a service name is removed from the connection.

5. The method of claim 1, wherein the termination event comprises at least one of a crash, an exit, or a reloading of the management subsystem.

6. The method of claim 1, wherein the management subsystem comprises at least one of a printer management subsystem, a display management subsystem, a scanner management subsystem, or a camera management subsystem.

7. The method of claim 1, wherein the registration comprises a service name associated with the management subsystem and the color device.

8. The method of claim 7, wherein the termination event comprises a removal of the service name from the connection.

9. A non-transitory computer readable storage medium comprising instructions that, when executed by a processing device, cause the processing device to:
    identify, by the processing device, a registration of a color device by a management subsystem via a connection with a message communication system, wherein the comprises color device information;
    in response to the registration, store, by the processing device, the color device information of the registration in a database;
    identify a color profile associated with a session;
    assign the color profile to the color device;
    execute the color device in accordance with the color profile;
    monitor, by the processing device, the connection used to register the color device to detect a removal from the message communication system of at least one of a service name or address associated with the management subsystem in view of a termination event associated with the management subsystem; and
    remove, by the processing device, the color device information from the database in response to the identification of the termination event.

10. The non-transitory computer readable storage medium of claim 9, wherein the message communication system comprises an inter-process communication bus.

11. The non-transitory computer readable storage medium of claim 9, the processing device to query the connection to identify the termination event.

12. The non-transitory computer readable storage medium of claim 9, wherein the monitoring comprises listening to the connection used to register the color device to determine if a service name is removed from the connection.

13. The non-transitory computer readable storage medium of claim 9, wherein the termination event comprises at least one of a crash, an exit, or a reloading of the management subsystem.

14. The non-transitory computer readable storage medium of claim 9, wherein the management subsystem comprises at least one of a printer management subsystem, a display management subsystem, a scanner management subsystem, or a camera management subsystem.

15. The non-transitory computer readable storage medium of claim 9, wherein the registration comprises a service name associated with the management subsystem and the color device.

16. The non-transitory computer readable storage medium of claim 15, wherein the termination event comprises a removal of the service name from the connection.

17. A system comprising:
    a memory to store a database, and
    a processing device, operatively coupled to the memory, the processing device to:
        identify a registration of a color device by a management subsystem via a connection with a message communication system, wherein the registration comprises color device information;
        in response to the registration, store the color device information of the registration in a database;
        identify a color profile associated with a session;
        assign the color profile to the color device;

execute the color device in accordance with the color profile;

monitor the connection used to register the color device to detect a removal from the message communication system of at least one of a service name or address associated with the management subsystem in view of a termination event associated with the management subsystem; and remove the color device information from the database in response to the termination event.

18. The system of claim 17, wherein the message communication system comprises an inter-process communication bus.

19. The system of claim 17, the processing device to query the connection to identify the termination event.

20. The system of claim 17, the processing device to listen to the connection used to register the color device to determine if a service name is removed from the connection.

21. The system of claim 17, wherein the termination event comprises at least one of a crash, an exit, or a reloading of the management subsystem.

22. The system of claim 17, wherein the management subsystem comprises at least one of a printer management subsystem, a display management subsystem, a scanner management subsystem, or a camera management subsystem.

23. The system of claim 17, wherein the registration comprises a service name associated with the management subsystem and the color device.

24. The system of claim 23, wherein the termination event comprises a removal of the service name from the connection.

* * * * *